US012342443B2

(12) United States Patent
Oh et al.

(10) Patent No.: US 12,342,443 B2
(45) Date of Patent: Jun. 24, 2025

(54) INDUCTION HEATING DEVICE WITH IMPROVED INTERFERENCE NOISE ELIMINATION AND OUTPUT CONTROL FUNCTIONS

(71) Applicant: LG Electronics Inc., Seoul (KR)

(72) Inventors: Dooyong Oh, Seoul (KR); Byeong Wook Park, Seoul (KR); Seungbok Ok, Seoul (KR); Jae-Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/196,840

(22) Filed: May 12, 2023

(65) Prior Publication Data

US 2023/0284346 A1 Sep. 7, 2023

Related U.S. Application Data

(63) Continuation of application No. 16/956,311, filed as application No. PCT/KR2018/014878 on Nov. 28, 2018, now Pat. No. 11,690,141.

(30) Foreign Application Priority Data

Dec. 20, 2017 (KR) ........................ 10-2017-0176046

(51) Int. Cl.
*H05B 6/04* (2006.01)
*H05B 6/06* (2006.01)

(52) U.S. Cl.
CPC ................. *H05B 6/04* (2013.01); *H05B 6/06* (2013.01)

(58) Field of Classification Search
CPC ............. H05B 6/06; H05B 6/04; H05B 6/062
See application file for complete search history.

(56) References Cited

U.S. PATENT DOCUMENTS

| | | | | |
|---|---|---|---|---|
| 8,921,747 B2 * | 12/2014 | Wang | H05B 6/062 219/620 |
| 2003/0164373 A1 * | 9/2003 | Hirota | H05B 6/062 219/664 |
| 2007/0102420 A1 * | 5/2007 | Miyauchi | H05B 6/062 219/661 |
| 2010/0170893 A1 | 7/2010 | Breuninger et al. | |

(Continued)

FOREIGN PATENT DOCUMENTS

| | | |
|---|---|---|
| JP | 2005149737 | 6/2005 |
| JP | 2006331964 | 12/2006 |

(Continued)

OTHER PUBLICATIONS

Extended European Search Report in European Appln. No. 18893086.1, dated Aug. 11, 2021, 6 pages.

*Primary Examiner* — Dana Ross
*Assistant Examiner* — Kuangyue Chen
(74) *Attorney, Agent, or Firm* — Fish & Richardson P.C.

(57) ABSTRACT

An induction heating device includes a working coil and a resonance capacitor, an inverter that performs a switching operation to supply a resonance current to the working coil, a plurality of snubber capacitors electrically connected to the inverter, a direct current (DC) link capacitor electrically connected to the inverter, and a relay configured to electrically connect one of the plurality of snubber capacitors to the DC link capacitor or the resonance.

9 Claims, 9 Drawing Sheets

1

(56) References Cited

U.S. PATENT DOCUMENTS

| | | | | |
|---|---|---|---|---|
| 2011/0228564 | A1* | 9/2011 | Uruno | H03K 17/168<br>327/109 |
| 2017/0223780 | A1 | 8/2017 | Heo et al. | |
| 2018/0183353 | A1* | 6/2018 | Baek | H02M 7/483 |

FOREIGN PATENT DOCUMENTS

| | | |
|---|---|---|
| JP | 2009099350 | 5/2009 |
| JP | 4444076 | 3/2010 |
| JP | 2014056684 | 3/2014 |
| JP | 2017045505 | 3/2017 |
| KR | 20110009544 | 1/2011 |
| KR | 20170075913 | 7/2017 |

* cited by examiner

RELATED ART

RELATED ART

RELATED ART

INDUCTION HEATING DEVICE WITH IMPROVED INTERFERENCE NOISE ELIMINATION AND OUTPUT CONTROL FUNCTIONS

CROSS-REFERENCE TO RELATED APPLICATIONS

This application is a continuation of U.S. application Ser. No. 16/956,311, filed Jun. 19, 2020, which is a National Stage application under 35 U.S.C. § 371 of International Application No. PCT/KR2018/014878, filed on Nov. 28, 2018, which claims the benefit of Korean Patent Application No. 10-2017-0176046, filed on Dec. 20, 2017. The disclosures of the prior applications are incorporated by reference in their entirety.

TECHNICAL FIELD

The present disclosure relates to an induction heating device with improved interference noise elimination and output control functions.

BACKGROUND

Various types of cooking apparatuses may be used to heat food in homes and restaurants. For example, gas stoves may use gas as a fuel to heat food. In some cases, cooking devices may heat an object such as a cooking container including, for example, a pot, using electricity instead of gas.

Methods for heating an object using electricity may be classified as a resistance heating method and an induction heating method. In the resistance heating method, an object may be heated by heat that is generated when electric current flows through a metallic resistance wire, or through a non-metallic heating element such as silicon carbide, and the heat may be delivered to the object through radiation or conduction. In the induction heating method, an object (e.g., a cooking container) itself may be heated by eddy currents that are generated in the object made of metallic ingredients, using a magnetic field generated around a coil when a predetermined magnitude of high-frequency power is supplied to the coil.

In some cases, an induction device, when a plurality of containers are heated, may set a driving frequency corresponding to an output of each of the containers. Due to a difference in the driving frequencies of the containers, interference noise may be generated. In some cases, when the difference in driving frequencies of the containers is in a range of audible frequencies, users may experience unpleasant feelings.

FIG. 1 is a view illustrating an induction heating device of related art.

Referring to FIG. 1, amplitude modulation is used for the induction heating device of the related art to prevent generation of high-frequency currents in an audible frequency band, which is a cause for interference noise. That is, the induction heating device of the related art performs an algorithm for eliminating container noise on the basis of information obtained from a laser Doppler vibrometer (LDV) that measures a magnetic field.

In some cases, the induction heating device may be designed to minimize a difference in driving frequencies of each container to minimize interference noise that is generated when a plurality of containers are heated. In some cases, where the containers are driven at similar frequencies, a proper output may not be ensured. In some cases, turn on/turn off control may be performed to provide a low output. Due to the turn on/turn off control, continuous output operations may not be performed. In some cases, another type of noise may be generated between driving (i.e., an operation) and non-driving (i.e., a non operation).

In some examples, a method of setting a driving frequency of each container identically (i.e., use of a fixed frequency) may be used.

In some cases, where a fixed frequency is used, a pulse width (i.e., adjustment of duty, e.g., adjustment in a range of 10 to 50%) of a control signal (i.e., a control signal supplied to an inverter performing switching operations) may be adjusted to satisfy a wide range of outputs of the induction heating device.

FIGS. 2 and 3 are graphs illustrating an example of adjustment of duty in an induction heating device of related art.

Referring to FIG. 2, the upper graph illustrates waveforms of load voltage (VL; i.e., a voltage supplied to a working coil) and load current (IL; i.e., electric current flowing in a working coil) when duty (i.e., D1) is 50%, and the lower graph illustrates waveforms of switching element currents (Is) when duty is 50%.

The graph illustrated in FIG. 2 may be a graph corresponding to the induction heating device of the related art. For example, when duty (D1) of a gate signal supplied to the first switching element is 50%, duty (D2) of a gate signal supplied to the second switching element may also be 50%. When duty (D1) of a gate signal supplied to the first switching element is 30%, duty (D2) of a gate signal supplied to the second switching element may be 70%.

FIG. 2 illustrates the switching element current (IS) when duty is 50% and a phase of load voltage (VL) leads a phase of load current (IL).

Referring to FIG. 3, the upper graph illustrates waveforms of load voltage (VL) and load current (IL) when duty (i.e., D1) is 30%, and the lower graph illustrates waveforms of switching element currents (Is) when duty is 30%.

As illustrated in FIG. 3, when the duty is less than 35%, a phase of load voltage (VL) may lag behind a phase of load current (IL), loss may occur in the switching element currents (IS), and an amount of heat generated in the switching element may be increased.

In some cases, when the duty is less than 35%, Zero Voltage Switching (ZVS) may not occur in the switching element of the inverter, and loss may be caused by reverse recovery current in the switching element of the inverter. In some cases, a discharge loss may occur in a snubber capacitor that reduces surge voltages, rush currents, and the like of the inverter. Thus, an amount of heat generated in the switching element may be increased.

SUMMARY

The present disclosure describes an induction heating device that can reduce or eliminate interference noise generated when a plurality of containers are heated.

The present disclosure also describes an induction heating device that can implement continuous output operations in a wide range of outputs.

Aspects of the present disclosure are not limited to the above-described ones. Additionally, other aspects and advantages that have not been mentioned can be clearly understood from the following description and can be more clearly understood from implementations. Further, it will be understood that the aspects and advantages of the present disclosure can be realized via means and combinations thereof that are described in the appended claims.

According to one aspect of the subject matter described in this application, an induction heating device includes a resonance circuit including a working coil and a resonance capacitor, an inverter configured to perform a switching operation to thereby supply a resonance current to the working coil, a plurality of snubber capacitors electrically connected to the inverter, a direct current (DC) link capacitor electrically connected to the inverter, and a relay configured to electrically connect one of the plurality of snubber capacitors to the DC link capacitor or the resonance capacitor.

Implementations according to this aspect may include one or more of the following features. For example, the inverter may include a first switching element and a second switching element that are configured to perform the switching operation, and the plurality of snubber capacitors may include a first snubber capacitor corresponding to the first switching element, and a second snubber capacitor corresponding to the second switching element.

In some implementations, a first end of the first switching element and a first end of the first snubber capacitor may be electrically connected to a first end of the DC link capacitor, where the first end of the DC link capacitor is configured to be supplied with a DC voltage. A second end of the first switching element, a second end of the first snubber capacitor, and the resonance capacitor may be electrically connected to a central node disposed between the first snubber capacitor and the second snubber capacitor. A first end of the second switching element and a first end of the second snubber capacitor may be electrically connected to the central node. A second end of the second switching element may be electrically connected to a second end of the DC link capacitor, where the second end of the DC link capacitor is connected to ground, and the relay may be configured to electrically connect the second end of the second snubber capacitor to the second end of the DC link capacitor or to the resonance capacitor.

In some examples, the relay may have a first end connected to the second end of the second snubber capacitor, and a second end that is configured to switch between the second end of the DC link capacitor and an end of the resonance capacitor. In some examples, the resonance capacitor may have a first end electrically connected to the central node, and a second end electrically connected to the working coil, where the relay may be configured to electrically connect the second end of the second snubber capacitor to the second end of the resonance capacitor.

In some implementations, a first end of the first switching element may be electrically connected to a first end of the DC link capacitor, the first end of the DC link capacitor being configured to be supplied with a DC voltage, and the relay may be configured to electrically connect a first end of the first snubber capacitor to the first end of the DC link capacitor or the resonance capacitor. A second end of the first switching element, a second end of the first snubber capacitor, and the resonance capacitor may be electrically connected to a central node disposed between the first snubber capacitor and the second snubber capacitor. A first end of the second switching element and a first end of the second snubber capacitor may be electrically connected to the central node, and a second end of the second switching element and a second end of the second snubber capacitor may be electrically connected to a second end of the DC link capacitor, the second end of the DC link capacitor being connected to ground.

In some examples, the relay may have a first end configured to switch between the first end of the DC link capacitor and an end of the resonance capacitor, and a second end connected to the first end of the first snubber capacitor. In some examples, the resonance capacitor may have a first end electrically connected to the central node and a second end electrically connected to the working coil, where the relay is configured to electrically connect the first snubber capacitor to the second end of the resonance capacitor.

In some implementations, the resonance circuit may be electrically connected in parallel to the second switching element. The relay may be configured to electrically connect between the second snubber capacitor and an end of the DC link capacitor that is connected to ground, where the relay is configured to allow a phase of a voltage supplied to the second switching element to lead a phase of an electric current in the working coil. In some examples, the relay may be configured to electrically connect the second snubber capacitor in parallel to the resonance capacitor.

In some implementations, the resonance circuit may be electrically connected in parallel to the second switching element. The relay may be configured to electrically connect between the first snubber capacitor and an end of the DC link capacitor that is configured to be supplied with a DC voltage, where the relay is configured to allow a phase of a voltage supplied to the second switching element to read a phase of an electric current in the working coil.

In some implementations, the relay may be configured to electrically connect the first snubber capacitor in parallel to the resonance capacitor.

In some implementations, the induction heating device may further include a semiconductor switch that is electrically connected to the working coil and configured to turn on and turn off the working coil, where the inverter, the relay, and the semiconductor switch may be configured to be controlled by a controller. In some examples, the inverter may be configured to control an output of the working coil based on a control signal supplied from the controller, the control signal having a fixed frequency, and to adjust the output of the working coil based on a change of a pulse width of the control signal.

In some implementations, the induction heating device may further include a rectifier configured to convert alternating current (AC) power received from a power supply into DC power and to supply the DC power to the inverter, where the DC link capacitor may be electrically connected in parallel to the rectifier and configured to reduce a variation of the DC power supplied to the inverter.

In some examples, the inverter may be a half-bridge type inverter.

In some examples, the resonance capacitor may be electrically connected in series with the working coil, and the DC link capacitor may be electrically connected in parallel to the inverter.

In some examples, the first switching element and the second switching element may be electrically connected in series with each other, and the central node may be connected to a node disposed between the second end of the first switching element and the first end of the second switching element.

In some implementations, the induction heating device may adjust a pulse width under conditions of fixed frequencies without an additional device such as an LDV, and may reduce or eliminate interference noise that is generated when a plurality of containers are heated, thereby cutting costs incurred for the additional device and ensuring improved user satisfaction and convenience through the elimination of interference noise.

The induction heating device may implement a wide range of outputs without overheating a switching element through simple improvement in a circuit structure (i.e., addition of a single relay), and may implement continuous output operations in a wide range of outputs, thereby ensuring improved performance and credibility of products.

Detailed effects of the present disclosure are described together with the above-described effects in the detailed description of the disclosure.

DETAILED DESCRIPTION

Figure 1:
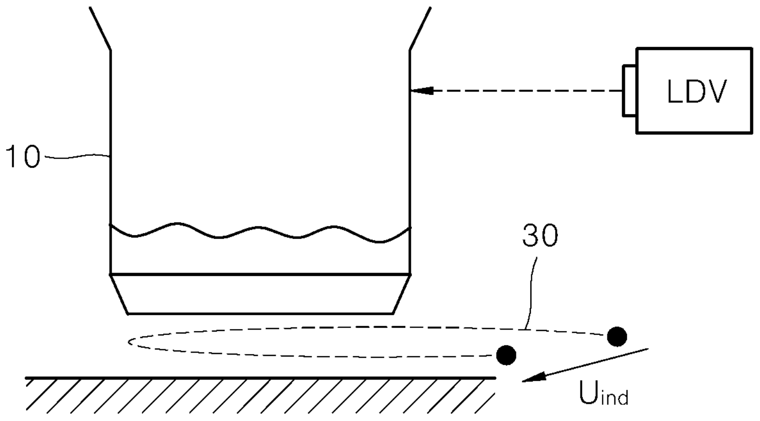
FIG. 1 is a view illustrating an induction heating device of related art.

Below, one or more implementations of the present disclosure are described with reference to the accompanying drawings. Throughout the drawings, like reference numerals denote like elements.

Figure 4:
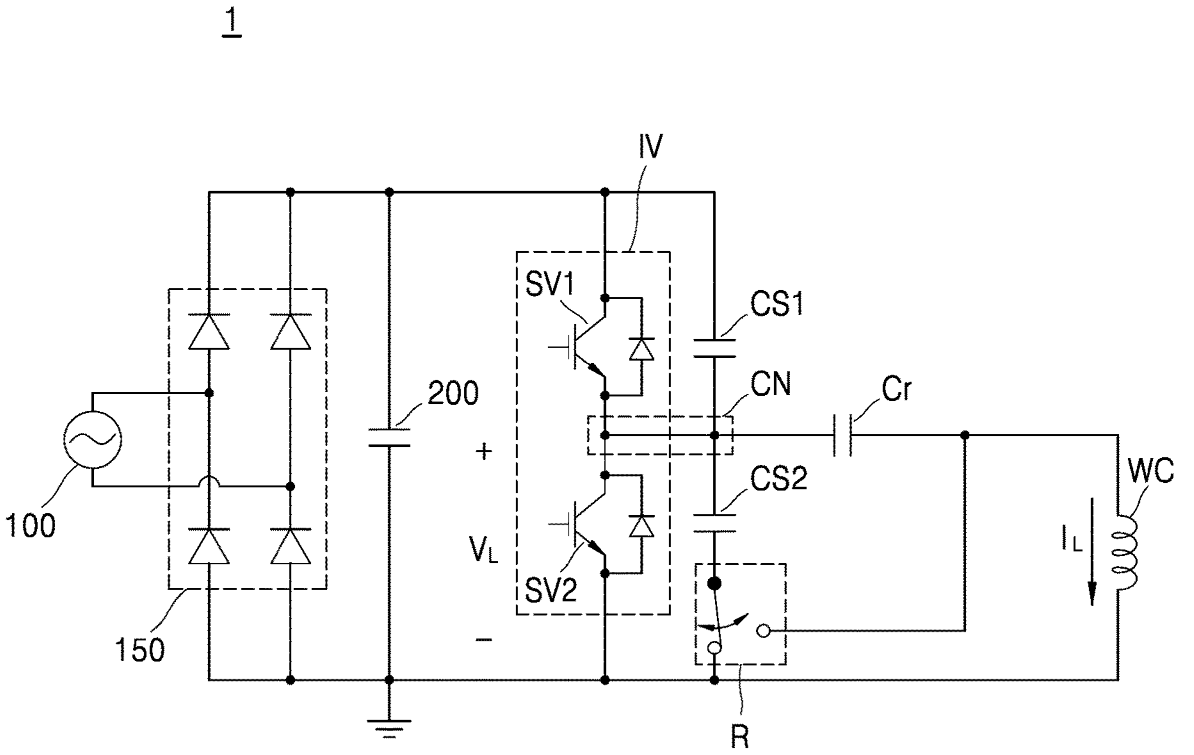
FIG. 4 is a circuit diagram illustrating an example of an induction heating device.

FIG. 4 is a block diagram illustrating an example of an induction heating device.

Referring to FIG. 4, the induction heating device 1 may include a power supply 100, a rectifier 150, a DC link capacitor 200, an inverter (IV), a plurality of snubber capacitors (CS1 and CS2), a resonance capacitor (Cr), a working coil (WC), and a relay (R).

In some implementations, the induction heating device 1 may further include a controller and an input interface. For example, the controller may include an electric circuit, a microprocessor, a computer, a communication device, or the like.

The controller may control operations of various components (e.g., an inverter (IV), a relay (R) and the like) in the induction heating device 1. The input interface, which is a module for inputting heating intensity desired by a user or a driving time period of the induction heating device, and the like, may be implemented in various different forms including the form of a physical button or a touch panel and the like, and may supply an input provided by a user to the controller. For convenience of description, detailed description in relation to the controller and the input interface is omitted.

In some implementations, the number of some of the components (e.g., a plurality of inverters and working coils and the like) of the induction heating device in FIG. 4 may vary. However, for convenience of description, suppose that the number of components of the induction heating device 1 is the same as the number of components in FIG. 4.

The power supply 100 may output alternating current (AC) power.

The power supply 100 may output AC power and may supply the AC power to the rectifier 150. The power supply 100, for example, may be a commercial power supply.

The rectifier 150 may convert the AC power received from the power supply 100 into direct current (DC) power and may supply the DC power to the inverter (IV).

The rectifier 150 may rectify the AC power received from the power supply 100 and may convert the AC power into DC power.

The DC power rectified by the rectifier 150 may be supplied to the DC link capacitor 200 (i.e., a smoothing capacitor) electrically connected in parallel with the rectifier 150, and the DC link capacitor 200 may reduce ripple of the DC power.

One end of the DC link capacitor 200 may be supplied with a voltage of DC power (i.e., a direct voltage), and the other end of the DC link capacitor 200 may be ground.

In some implementations, the DC power rectified by the rectifier 150 may be supplied to a filter unit rather than the DC link capacitor 200, and the filter unit may remove an AC component left in the DC power. For instance, the filter unit may include an electric circuit to provide an electric filter.

In some implementations, AC power rectified by the rectifier 150 may be supplied to the DC link capacitor 200 in the induction heating device 1.

The inverter (IV) may be electrically connected to a resonance circuit (i.e., a circuit area at which the working coil (WC) and the resonance capacitor (Cr) are included), and may supply resonance currents to the working coil (WC) through switching operations.

The inverter (IV), for example, may have a half-bridge form and its switching operations may be controlled by the above-described controller. That is, the inverter (IV) may perform switching operations on the basis of switching signals (i.e., control signals, also referred to as gate signals) received from the controller. For example, a half-bridge type inverter may include two switching elements and two capacitors while a full-bridge type inverter may include four switching elements.

The inverter (IV) may include two switching elements (SV1, and SV2) that perform switching operations, and the two switching elements (SV1, and may be alternately turned on and turned off by control signals received from the controller. In some examples, the switching elements SV1 and SV2 may include a transistor, metal oxide semiconductor field effect transistor (MOSFET), insulated-gate bipolar transistor (IGBT), a diode, or the like.

High-frequency alternating currents (i.e., resonance currents) may be generated by switching operations of the two switching elements (SV1, and SV2), and the generated high-frequency alternating currents may be supplied to the working coil (WC).

In some examples, control signals supplied to each switching element (SV1, and SV2) may be complementary. Accordingly, when a duty (i.e., a pulse width) of a control signal supplied to the first switching element (SV1) is 50%, duty of a control signal supplied to the second switching element (SV2) may also be 50%. When the duty of a control signal supplied to the first switching element (SV1) is 30%, the duty of a control signal supplied to the second switching element (SV2) may be 70%. For instance, the duty may be a duration for which a magnitude of the control signal is greater than a reference magnitude (e.g, 0).

In some implementations, a plurality of snubber capacitors (CS1 and CS2) and the DC link capacitor 200 may be electrically connected with the inverter (IV).

For example, one end of the first switching element (SV1) and one end of a first snubber capacitor (CS1) may be electrically connected to one end of the DC link capacitor 200, to which a DC voltage is supplied, and the other end of the first switching element (SV1) and the other end of the first snubber capacitor (CS1) may be electrically connected to a central node (CN) together with the resonance capacitor (Cr). Additionally, one end of the second switching element (SV2) and one end of a second snubber capacitor (CS2) may be electrically connected to the central node (CN), and the other end of the second switching element (SV2) may be electrically connected to the other end of the DC link capacitor 200, which is ground.

The plurality of snubber capacitors (CS1 and CS2) may be electrically connected to the inverter (IV).

The plurality of snubber capacitors (CS1 and CS2) may include a first snubber capacitor (CS1) corresponding to the first switching element (SV1), and a second snubber capacitor (CS2) corresponding to the second switching element (SV2).

Any one (i.e., the second snubber capacitor (CS2)) of the plurality of snubber capacitors (CS1 and CS2) may be selectively electrically connected to any one of the DC link capacitor 200 and the resonance capacitor (Cr) through the relay (R). Detailed description in relation to this is provided hereunder.

The plurality of snubber capacitors (CS1 and CS2) are provided to control and reduce rush currents or transient voltages generated in the switching elements (SV1, and SV2) respectively corresponding to the plurality of snubber capacitors (CS1 and CS2). In some cases, the plurality of snubber capacitors (CS1 and CS2) may be used to eliminate electromagnetic noise.

The working coil (WC) may receive resonance currents form the inverter (IV).

Specifically, one end of the working coil (WC) is electrically connected to the resonance capacitor (Cr), and the other end of the working coil (WC) may be electrically connected to the other end of the DC link capacitor 200 (i.e. ground).

An object may be heated by eddy currents that are generated between the working coil (WC) and the object (e.g., a cooking container) by high-frequency alternating currents supplied from the inverter (IV) to the working coil (WC).

The resonance capacitor (Cr) may be electrically connected to the working coil (WC).

The resonance capacitor (Cr) may be electrically connected in series with the working coil (WC), and may constitute the resonance circuit together with the working coil (WC). That is, one end of the resonance capacitor (Cr) may be electrically connected to the central node (CN), and the other end of the resonance capacitor (Cr) may be electrically connected to the working coil (WC).

The resonance capacitor (Cr) may start to resonate when a voltage is supplied by switching operations of the inverter (IV). When the resonance capacitor (Cr) resonates, electric currents flowing in the working coil (WC) electrically connected with the resonance capacitor (Cr) may increase.

Through the above-described process, eddy currents are induced to an object placed on an upper portion of the working coil (WC) electrically connected to the resonance capacitor (Cr).

The relay (R) may selectively connect the second snubber capacitor (CS2) to the DC link capacitor 200 or the resonance capacitor (Cr).

The relay (R) may be electrically connected between the other end of the second snubber capacitor (CS2) and the other end of the DC link capacitor 200 or between the other end of the second snubber capacitor (CS2) and the resonance capacitor (Cr).

Detailed description in relation to an optional connection of the relay (R) is provided below.

In some implementations, the induction heating device 1 may perform the function of wireless power transmission on the basis of the above-described configurations and features.

For example, a battery of an electronic device using the wireless power transmitting technology may be charged by being placed on a charge pad without connecting to an additional charge connector. Accordingly, the electronic device, to which the wireless power transmitting technology is applied, may not need a cable or charger, which may help to improve mobility and reduce a size and weight of the device.

The wireless power transmitting technology may be classified as an electromagnetic induction technology using a coil, and a resonance technology using resonance, a radio emission technology for converting electric energy into microwaves and delivering the microwaves, and the like. Among the technologies, the electromagnetic induction technology is a technology in which power is transmitted using electromagnetic induction between a primary coil (e.g., the working coil (WC)) provided at an apparatus for wirelessly transmitting power and a secondary coil provided at an apparatus for wirelessly receiving power.

The theory of the induction heating technology of the induction heating device 1, where an object is heated through electromagnetic induction, may be substantially the same as that of the wireless power transmitting technology using electromagnetic induction.

Accordingly, in some implementations, the induction heating device 1 may perform the function of wireless power transmission as well as the function of induction heating. In some examples, an induction heating mode and a wireless power transmitting mode may be controlled by the controller. In some cases, the function of induction heating and the function of wireless power transmission may be selectively performed.

Figure 5:
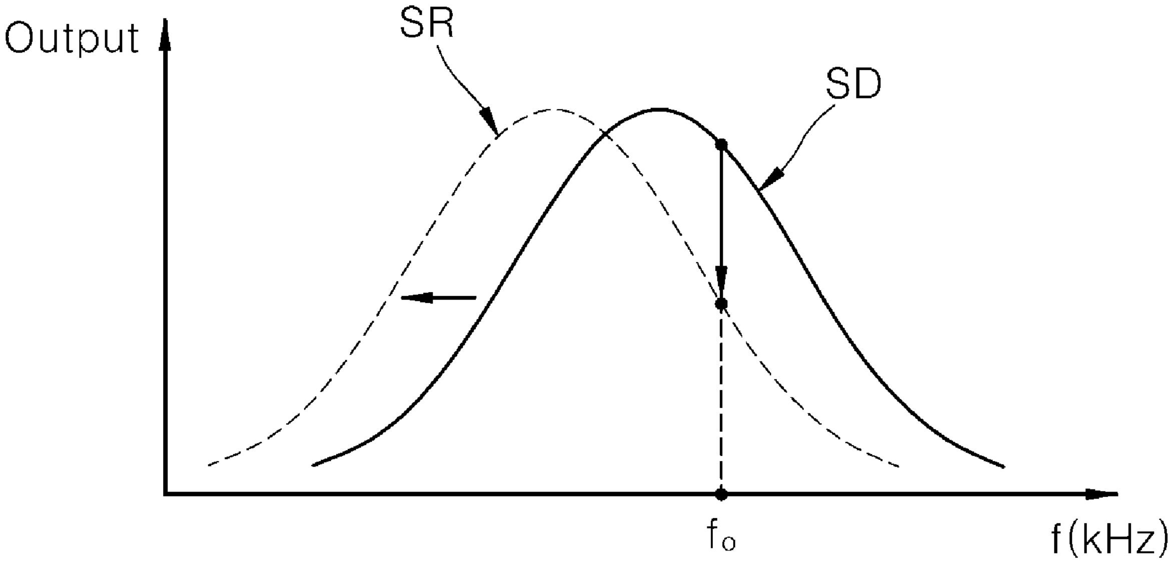
FIG. 5 is a view illustrating an example of an output control method of the induction heating device in FIG. 4.

An output control method of the induction heating device 1 with the above-described configurations and features is described hereunder with reference to FIG. 5.

FIG. 5 is a view illustrating an output control method of the induction heating device in FIG. 4.

Referring to FIGS. 4 and 5, the induction heating device 1 may use a fixed frequency ($f_0$). Accordingly, the induction heating device 1 may suppress interference noise that is generated when a plurality of containers are heated.

In some implementations, the induction heating device 1 may generate a high output at a fixed frequency ($f_0$). In some cases, a pulse width (i.e., duty) of a control signal supplied to the inverter (IV) (i.e., the signal supplied by the controller) may be adjusted (e.g., in a range of 10 to 50%) such that an output is lowered while the fixed frequency ($f_0$) is maintained.

Figure 2:
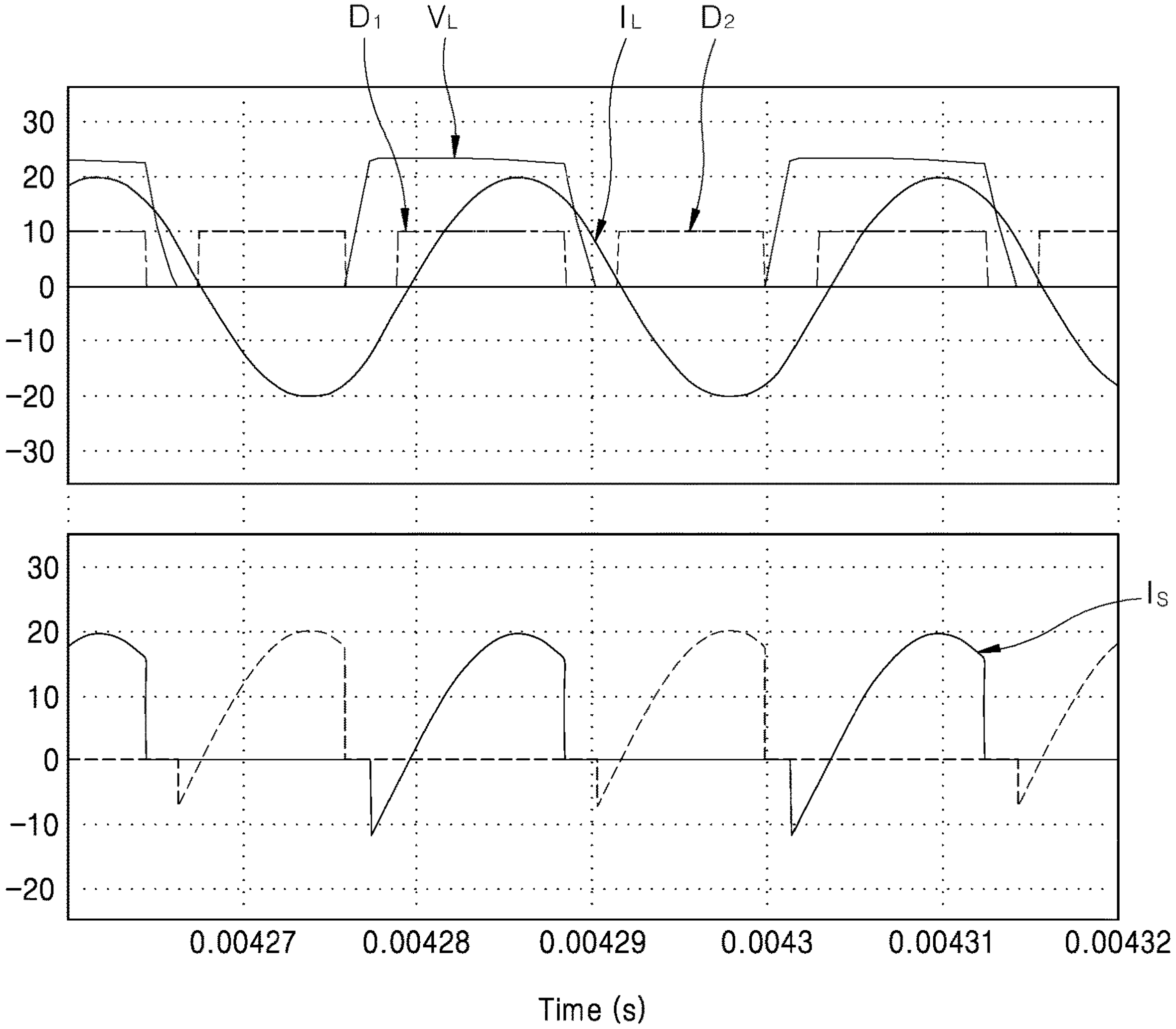
FIGS. 2 and 3 are graphs illustrating an example of adjustment of duty in an induction heating device of the related art.
Figure 3:
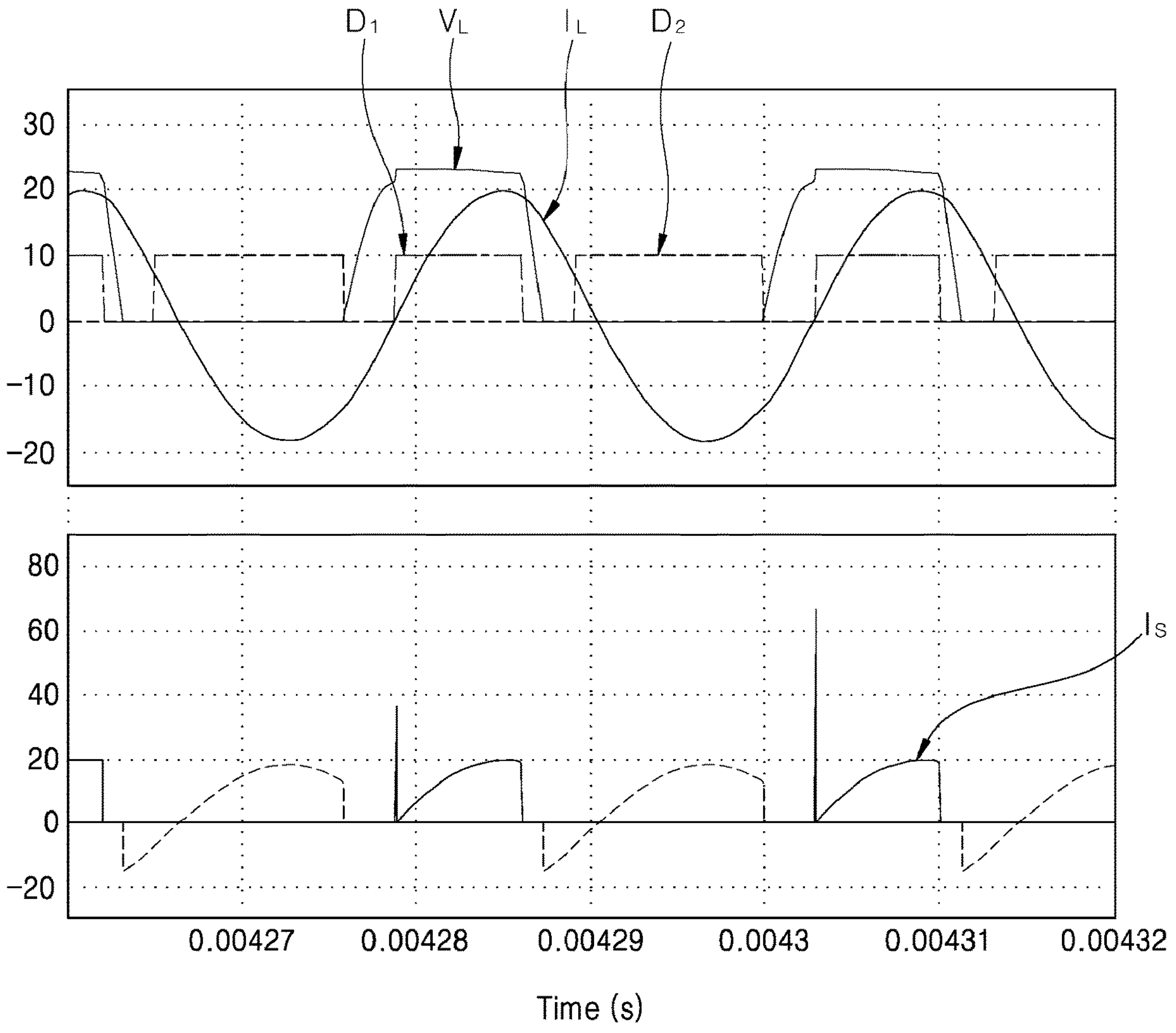

As described with reference to FIGS. 2 and 3, when duty is less than 35%, a phase of load voltage (VL) may lag behind a phase of load current (IL), resulting in a loss of switching element currents (i.e., electric currents flowing in the switching element). As a result, heat of the switching element (e.g., one switching element having duty smaller than the other switching element among SV1 and SV2) may increase.

For example, when duty is less than 35%, (herein, a value of duty is provided as an example but not limited), ZVS may not occur in the switching element (e.g., one switching element having smaller duty than the other switching element among SV1 and SV2) of the inverter (IV), loss is caused by reverse recovery current in the switching element of the inverter (IV), discharge loss occurs in a snubber capacitor (e.g., CS1 or CS2) that reduces surge voltages, rush currents and the like of the inverter (IV). Thus, an amount of heat generated in the switching element (e.g., SV1 or SV2) is increased.

In some examples, an output in the induction heating device 1 may be controlled as follows.

When the resonance circuit (i.e., the working coil (WC) and the resonance capacitor (Cr)) is electrically connected in parallel with the second switching element (SV2) and the relay (R) is electrically connected between the second snubber capacitor (CS2) and the other end of the DC link capacitor 200, which is ground, a phase of a voltage supplied to the second switching element (SV2) may lead a phase of an electric current flowing in the working coil (WC).

However, to lower an output, when duty is reduced while the fixed frequency ($f_0$) is maintained, a phase of an electric current flowing in the working coil (WC) may lead a phase of a voltage supplied to the second switching element (SV2), at a specific time point (e.g., when duty is less than 35%).

In this situation, the controller may connect the second snubber capacitor (CS2) to the resonance capacitor (Cr) (i.e., a parallel connection) by controlling the relay (R). By doing so, a resonance point is lowered, and a resonance frequency is also lowered (in other words, an existing resonance frequency graph (SD) is changed into a new resonance frequency graph (SR)).

That is, as the resonance frequency is lowered as illustrated in FIG. 5, an output may also be lowered at the same fixed frequency ($f_0$).

Thus, since a phase of the voltage supplied to the second switching element (SV2) leads a phase of the electric current flowing in the working coil (WC), the switching element may not overheat and the induction heating device 1 may produce a lower output than conventional induction heating device. Additionally, the switching element may not be controlled to be turned on/turned off. Thus, the induction heating device 1 may perform continuous output operations in a range wider than conventional induction heating device.

The induction heating device 1, as described above, may control a pulse width without an additional device such as an LDV under conditions of fixed frequencies, thereby eliminating interference noise that is generated when a plurality of containers are heated, reducing costs incurred for the additional device, and ensuring improved user satisfaction and convenience through the elimination of interference noise.

Further, the induction heating device 1 may implement a wide range of outputs without overheating a switching element (e.g., SV1 or SV2) through simple improvement in a circuit structure (i.e., addition of a single relay (R)), and may implement continuous output operations in a wide range of outputs, thereby ensuring improved performance and credibility of products.

Figure 6:
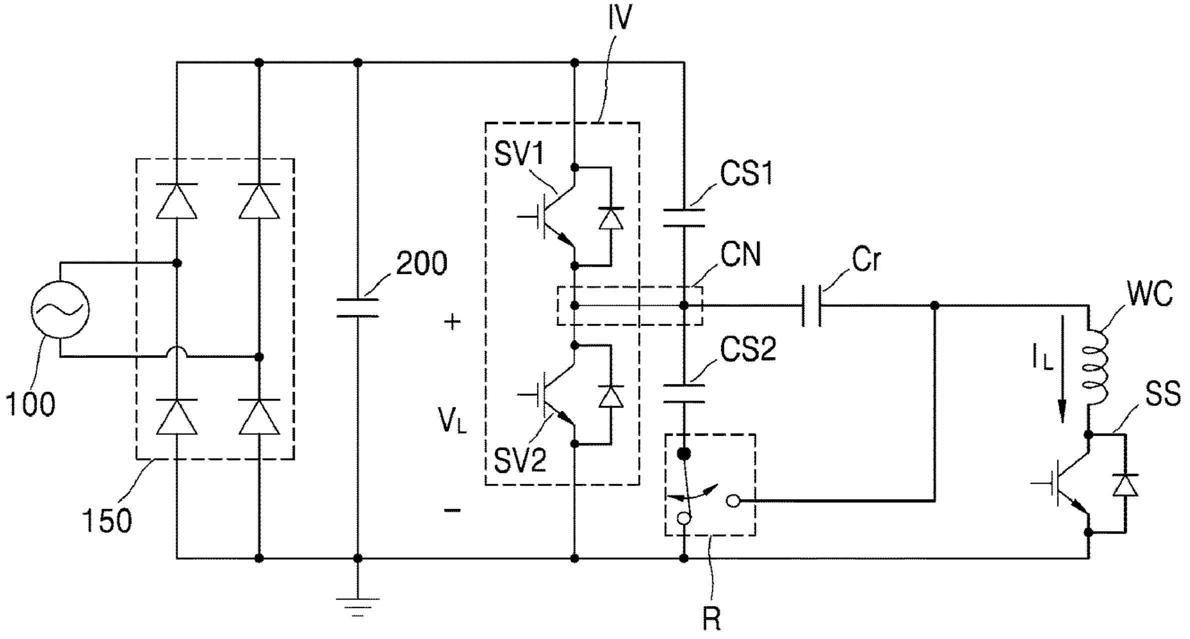
FIG. 6 is a circuit diagram illustrating the induction heating device in FIG. 4 implemented as a zone free-type induction heating device.

FIG. 6 is a circuit diagram illustrating the induction heating device in FIG. 4 implemented as a zone free-type induction heating device.

As illustrated in FIG. 6, a semiconductor switch (SS) is additionally electrically connected to the induction heating device 1 in FIG. 4, to turn on/turn off the working coil (WC) at high speed. When a plurality of the working coils (WC) and the semiconductor switches (SS) are provided, a zone free-type induction heating device may be implemented.

The zone free-type induction heating device may include a relay (R).

Below, an induction heating device is described with reference to FIG. 7.

Figure 7:
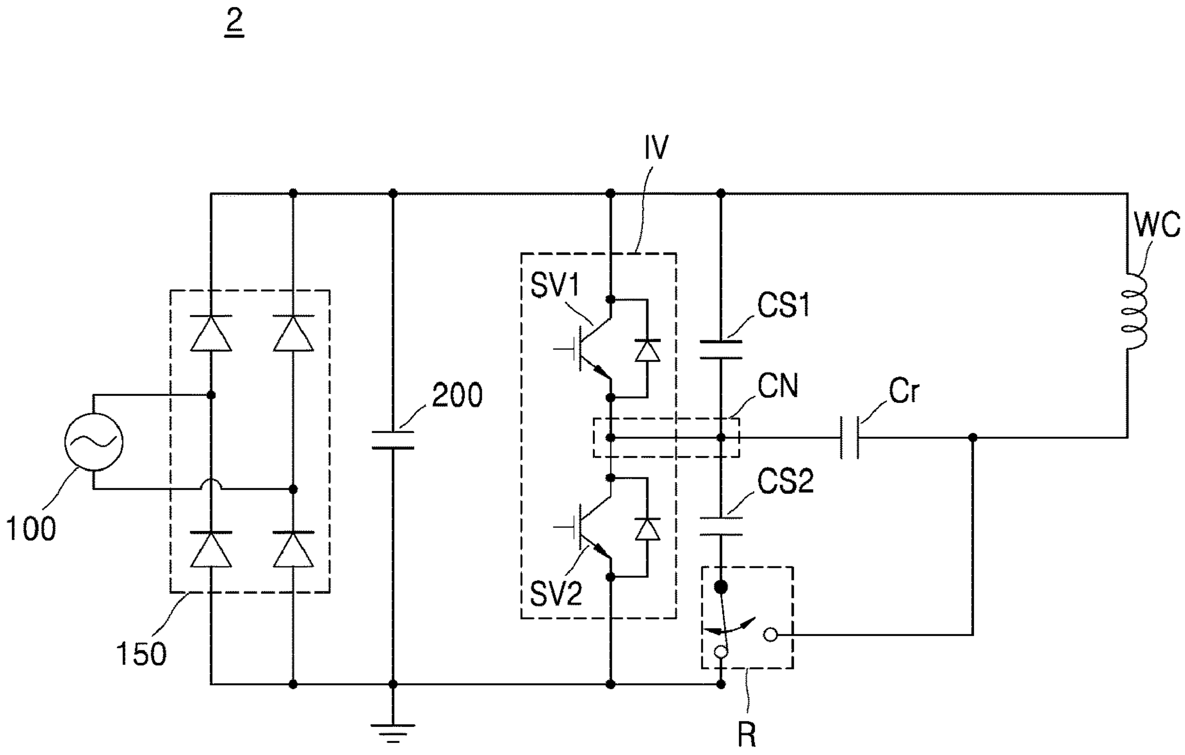
FIG. 7 is a circuit diagram illustrating an example of an induction heating device.

FIG. 7 is a circuit diagram illustrating an example of an induction heating device.

The induction heating device 2 is the same as the induction heating device 1 in FIG. 4 except for some components and structures. Accordingly, the differences are described hereunder.

Referring to FIG. 7, the induction heating device 2 may include a power supply 100, a rectifier 150, a DC link capacitor 200, an inverter (IV), a plurality of snubber capacitors (CS1 and CS2), a resonance capacitor (Cr), a working coil (WC), and a relay (R).

One end and the other end of the working coil (WC) of the induction heating device 2 in FIG. 7 may be respectively electrically connected to the resonance capacitor (Cr) and one end of the DC link capacitor 200 (i.e., a portion to which a DC voltage is supplied), unlike those of the induction heating device 1 in FIG. 4.

In summary, the induction heating device 2 may be the same as the induction heating device 1 in FIG. 4 when it comes to their operation processes or performance, effects and the like, except their connection relations with the working coil (WC) and their positions.

Below, an induction heating device is described with reference to FIG. 8.

Figure 8:
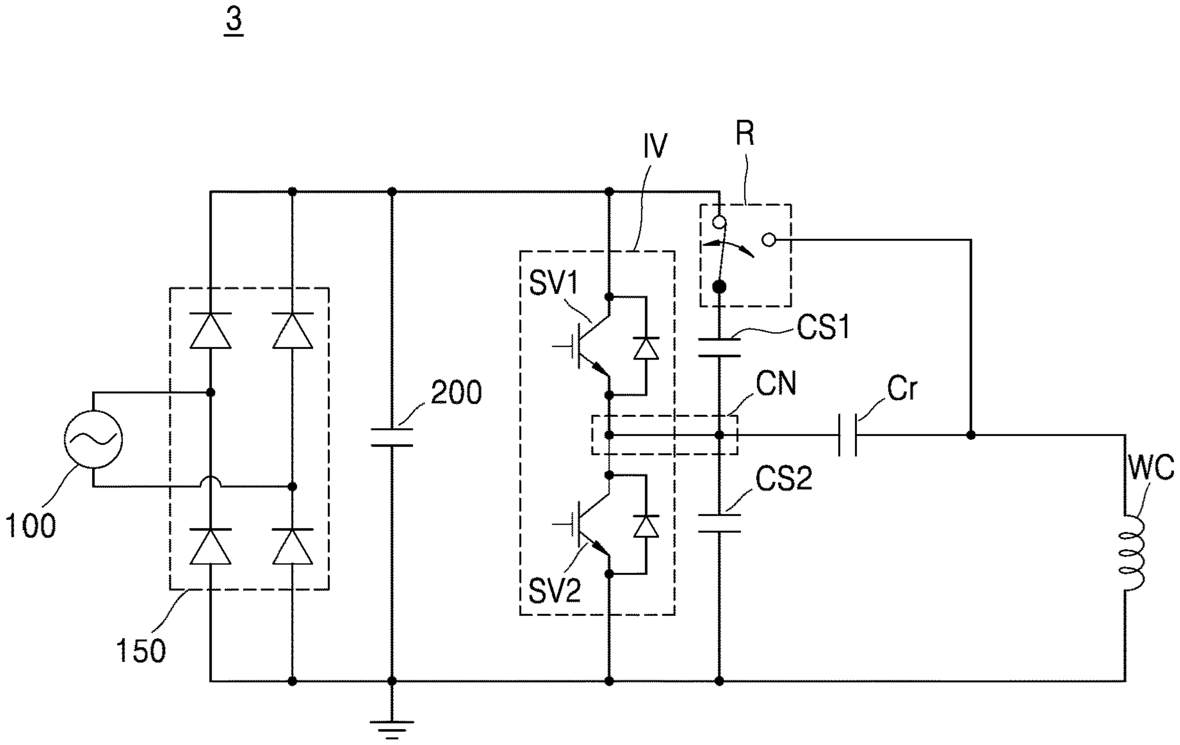
FIG. 8 is a circuit diagram illustrating an example of an induction heating device.

FIG. 8 is a circuit diagram illustrating an example of an induction heating device.

The induction heating device 3 is the same as the induction heating device 1 in FIG. 4 except for some components and structures. Accordingly, differences are described hereunder.

Referring to FIG. 8, the induction heating device 3 may include a power supply 100, a rectifier 150, a DC link capacitor 200, an inverter (IV), a plurality of snubber capacitors (CS1 and CS2), a resonant capacitor (Cr), a working coil (WC), and a relay (R).

The relay (R) of the induction heating device 3 in FIG. 8 may be electrically connected between one end of the first snubber capacitor (CS1) and one end of the DC link capacitor 200, or between one end of the first snubber capacitor (CS1) and the resonance capacitor (Cr) unlike that of the induction heating device 1 in FIG. 4. Additionally, the other end of the second snubber capacitor (CS2) may be electrically connected to the other end of the DC link capacitor 200.

In summary, the induction heating device 3 may have the same performance and effect as the induction heating device 1 in FIG. 4 when it comes to output control and elimination of interference noise as the first snubber capacitor (CS1) is selectively electrically connected to either one end of the DC link capacitor 200 or the resonance capacitor (Cr) through the relay (R).

Below, an induction heating device is described with reference to FIG. 9.

Figure 9:
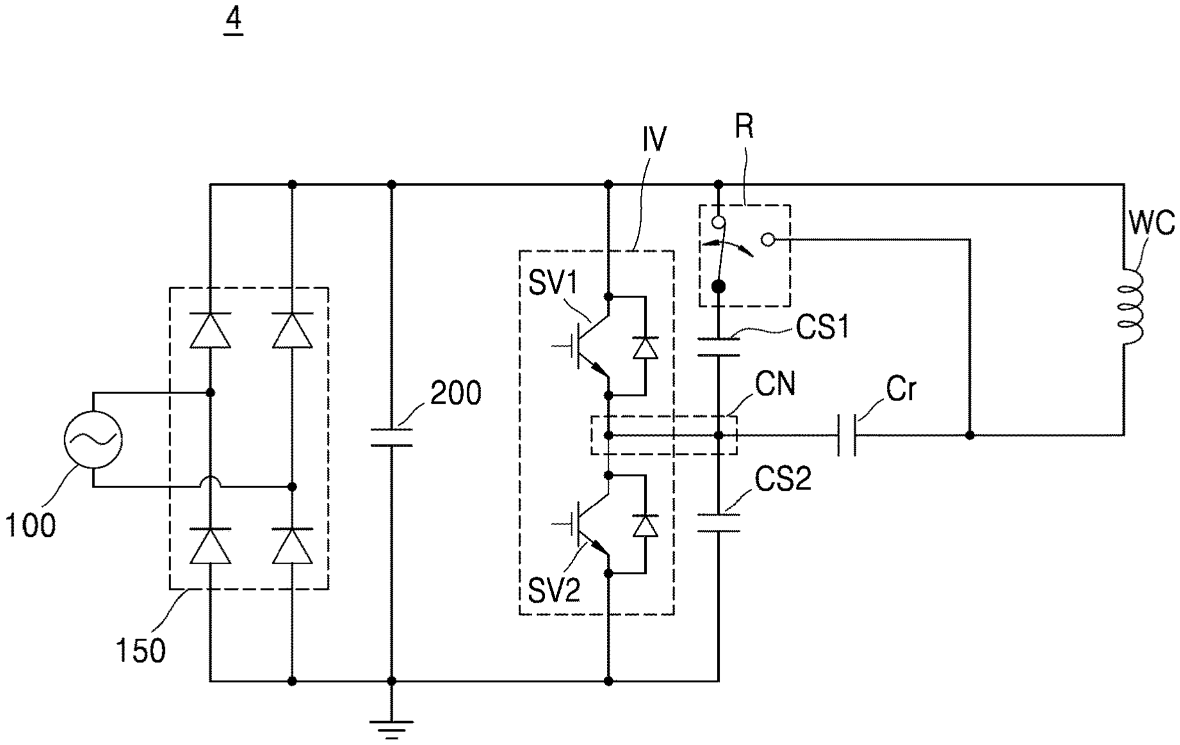
FIG. 9 is a circuit diagram illustrating an example of an induction heating device.

FIG. 9 is a circuit diagram illustrating an example of an induction heating device.

The induction heating device 4 is the same as the induction heating device 3 in FIG. 8 except for some components and structures. Accordingly, differences are described hereunder.

Referring to FIG. 9, the induction heating device 4 may include a power supply 100, a rectifier 150, a DC link capacitor 200, an inverter (IV), a plurality of snubber capacitors (CS1 and CS2), a resonance capacitor (Cr), a working coil (WC), and a relay (R).

One end and the other end of the working coil (WC) of the induction heating device 4 in FIG. 9 are respectively electrically connected to the resonance capacitor (Cr) and one end of the DC link capacitor 200 (i.e., a portion to which a DC voltage is supplied), unlike those of the induction heating device 3 in FIG. 8.

In summary, the induction heating device 4 may be the same as the induction heating device 3 in FIG. 8 when it comes to their operation processes or performance, effects and the like, except their connection relations with the working coil (WC) and their positions.

When a semiconductor switch (SS) is additionally electrically connected to the working coil (WC) to turn on/turn off the working coil (WC) at high speed and a plurality of the working coils (WC) and the semiconductor switches (SS) are provided, the induction heating devices 2, 3, and 4 may also be implemented as a zone free-type induction heating device.

The present disclosure, described above, may be replaced, modified and changed in various different forms without departing from the technical spirit of the disclosure by one having ordinary skill in the art to which the disclosure pertains. Thus, the present disclosure should not be construed as being limited to the implementations and drawings set forth herein.

What is claims is:

1. An induction heating device, comprising:

a resonance circuit including a working coil and a resonance capacitor;

an inverter configured to perform a switching operation to supply resonance currents to the working coil;

a plurality of snubber capacitors electrically connected to the inverter;

a direct current (DC) link capacitor, the DC link capacitor having (i) a first end electrically connected to the inverter and (ii) a second end electrically connected to a ground; and a relay configured to electrically connect one of the plurality of snubber capacitors to selectively one of the resonance capacitor and the ground.

2. The induction heating device of claim 1, wherein:

the inverter includes a first switching element and second switching element, wherein each of the first switching element and the second switching element is configured to perform the switching operation; and the plurality of snubber capacitors include a first snubber capacitor corresponding to the first switching element, and a second snubber capacitor corresponding to the second switching element.

3. The induction heating device of claim 2, wherein:

one end of the first switching element and one end of the first snubber capacitor are electrically connected to the first end of the DC link capacitor supplied with a DC voltage;

the other end of the first switching element, the other end of the first snubber capacitor, and the resonance capacitor are electrically connected to a central node;

one end of the second switching element and one end of the second snubber capacitor are electrically connected to the central node; and the other end of the second switching element is electrically connected to the ground.

4. The induction heating device of claim 3, wherein the relay is configured to electrically connect the second snubber capacitor to the resonance capacitor or the ground.

5. The induction heating device of claim 2, wherein, based on the resonance circuit is electrically connected in parallel with the second switching element and the relay is electrically connected between the second snubber capacitor and the ground, a phase of a voltage supplied to the second switching element leads a phase of an electric current flowing in the working coil.

6. The induction heating device of claim 1, further comprising:

a semiconductor switch that is electrically connected to the working coil to turn on or turn off the working coil; and a controller configured to control operations of the inverter, the relay and the semiconductor switch, respectively.

7. The induction heating device of claim 6, wherein the controller supplies a control signal having a fixed frequency to the inverter to control an output of the working coil, and the controller adjusts a pulse width of the control signal to adjust the output of the working coil.

8. The induction heating device of claim 1, further comprising:

a rectifier configured to convert alternating current (AC) power received from a power supply into DC power and supply the DC power to the inverter, and wherein the DC link capacitor is electrically connected in parallel with the rectifier and reduces ripple of the DC power.

9. The induction heating device of claim 1, wherein the inverter is a half-bridge inverter.

* * * * *